Oct. 6, 1970   F. L. KAUFMAN   3,532,350
REINFORCING SEAL
Filed March 1, 1967
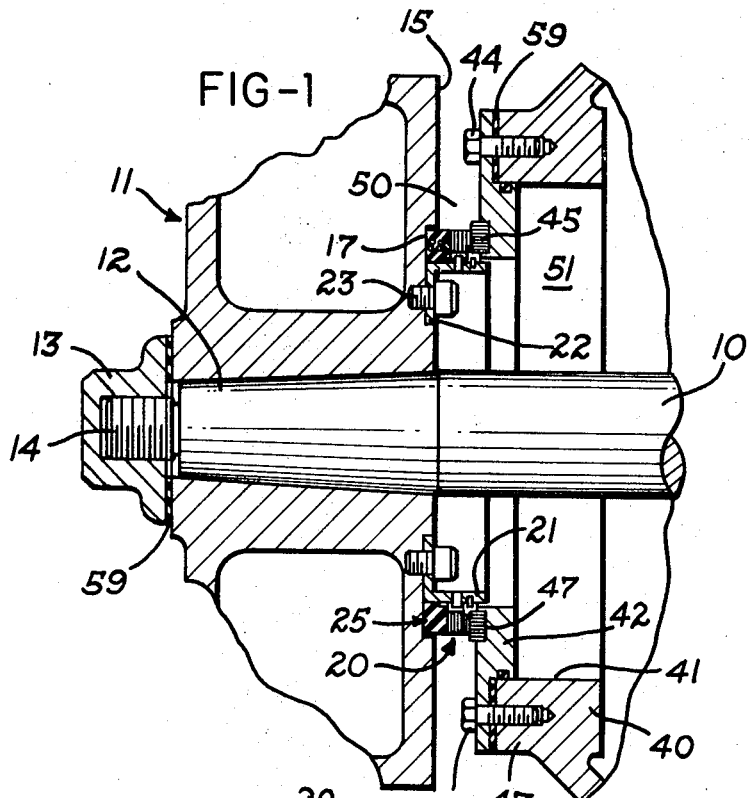
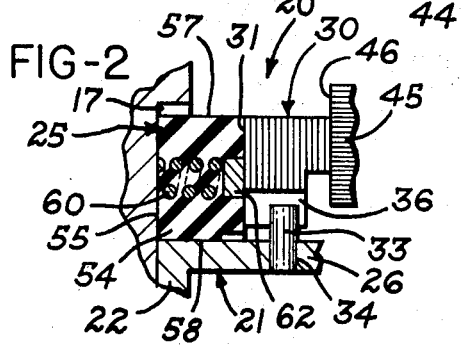
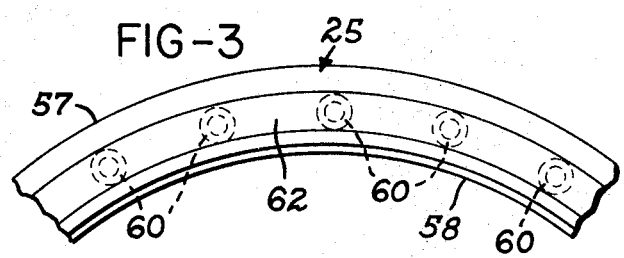
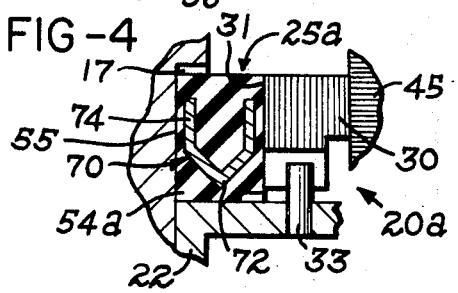
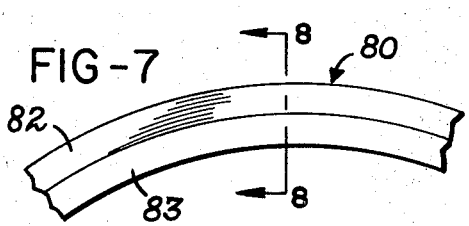
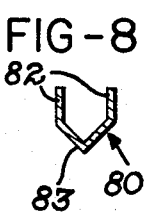
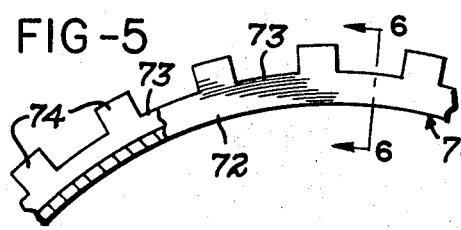
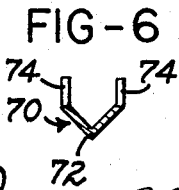
INVENTOR
FRANK L. KAUFMAN
BY
Marechal, Biebel, French & Bugg
ATTORNEYS

United States Patent Office 3,532,350
Patented Oct. 6, 1970

3,532,350
REINFORCING SEAL
Frank L. Kaufman, 108 Keith Ave.,
Trenton, Ohio 45067
Filed Mar. 1, 1967, Ser. No. 619,709
Int. Cl. F16j *15/16*
U.S. Cl. 277—235                3 Claims

ABSTRACT OF THE DISCLOSURE

A composite seal including an annular ring of a resilient material having springs imbedded therein for exerting additional force in the direction parallel to the major axis of the ring. The spring may take several different configurations and the resilient material likewise may be composed of several different materials including rubber, plastics and various corrosion resistant compounds.

BACKGROUND OF THE INVENTION

Frequently it is necessary to provide a packing for preventing the flow of fluids between two stationary or relatively movable components. The use of resilient materials such as rubber and plastics to form such a seal is well known. It is frequently necessary to provide a spring backup for the purpose of urging the packing member into tight sealing engagement with the adjacent components of the seal assembly. The springs take various shapes and because they are frequently subjected to corrosive fluids, they deteriorate and must be replaced. Sometimes, it is necessary to provide additional seals merely to protect the springs from contact with such corrosion fluids. Moreover, the use of such springs in combination with resilient seals or packing rings requires additional space, initial assembling time, and requires maintenance that usually requires shut-down of the associate machine.

SUMMARY OF THE INVENTION

Accordingly, this invention provides a composite resilient packing and spring device wherein spring means are imbedded in the packing member in such a manner that the spring is free from contact with any of the fluids which contact the outer surfaces of the packing member while providing for reinforcement of the packing member in a direction parallel to the major axis of the sealing ring. The spring means may take the form of individual coil springs mounted on their major axes parallel to the axis of the sealing ring, or a single resilient metal ring which has its axis coaxial with that of the sealing ring. When the coil springs are used, it is possible to provide one or more rigid contact plates which are flush with the contact surfaces of the packing member.

BRIEF DESCRIPTION OF THE DRAWINGS

FIG. 1 illustrates a typical assembly utilizing the packing member in accordance with the invention;

FIG. 2 is an enlarged fragmentary view, partially in section, showing the packing member;

FIG. 3 is a plan view of a segment of the packing member shown in FIG. 2;

FIG. 4 is a fragmentary view similar to FIG. 2 and illustrating another embodiment of the invention;

FIG. 5 is a plan view of the spring member utilized in the embodiment shown in FIG. 4;

FIG. 6 is a sectional view taken along the line 6—6 of FIG. 5;

FIG. 7 is a plan view similar to FIG. 5 and illustrating another embodiment of the invention; and FIG. 8 is a sectional view taken along the line 8—8 of FIG. 7.

DESCRIPTION OF THE PREFERRED EMBODIMENTS

Referring to the drawings wherein preferred embodiments of the invention are shown, FIG. 1 illustrates a typical apparatus for using a packing ring in accordance with the invention. The apparatus includes a rotating shaft 10 having the rotary disk member 11 secured to the tapered portion 12 thereof by the nut 13 which engages the threaded projection 14 on one end thereof. The rotary member 11 has a relatively flat right-hand surface 15 which may have the annular recess 17 therein for receiving the packing assembly 20 which rotates therewith.

The packing assembly 20 (FIGS. 1 and 2) comprises an annular support 21 having a right angle cross-section with the base portion 22 thereof being secured within the recess 17 by the conventional bolts 23. The annular packing ring 25 is disposed adjacent the axial portion 26 of the support 21 and the flat bottom surface of the recess 17, as shown in FIG. 2. Adjacent the packing ring 25 is a frictionless bearing 30 of graphite or the like which is also ring-shaped and disposed against the flat contact surface 31 of the packing ring 25. The drive pin 33 is press fitted into the opening 34 in the axial portion 26 of the support 21 and into a slot 36 in the graphite bearing 30 thereby causing the bearing 30 to rotate with the rotating member 11 without relative rotary movement between the packing ring 25 and bearing 30.

The stationary member 40 includes a radially inwardly extending member 41 having the annular member 42 secured on the boss portion 43 thereof by the conventional fastening members 44. This annular member supports the stationary graphite bearing 45 which has a flat contact surface 46 and is secured by any conventional means, e.g. by epoxy bonding, in the recess 47 formed in the member 42 to hold it rigidly in position.

The rotating graphite ring 30 is urged into intimate contact with the stationary graphite ring 45 by the annular packing ring 25 which also prevents the passage of fluids between the spaces 50 and 51 (FIG. 1) on opposite sides of the seal assembly 20. More specifically, the packing ring 25 includes the annular ring of resilient material 54, such as rubber or plastic, which has the radially extending and flat contact surfaces 31 and 55 on the opposite sides thereof perpendicular to the major axis of the packing ring 25 which is coaxial with the axis of the shaft 10. The outer surface 57 may be cylindrical as is the inner surface 58, the latter being bonded in intimate sealing relationship with the axial portion 26 on the support member 21. A plurality of packing seals 59 are provided between various components of the assembly to prevent the flow or leakage of fluid between the spaces 50 and 51. Specifically, these seals are provided between the rotary member 11 and the nut 13, and between the stationary member 40 and the annular member 42 which is secured thereto.

As shown in FIG. 3, a plurality of coil springs 60 are disposed centrally within the packing ring 25 parallel to the major axis thereof and perpendicular to the opposite contacting surfaces 31 and 55. These springs reinforce the biasing effect of the packing member so that when it is clamped between the rotating member 15 and the rotating graphite ring 30, it exerts a pressure against these members and resists the clamping forces to urge the bearings 30 and 45 together.

The precise number of springs 60, their outer diameters, the material from which they are made, the thickness of the wire or other material used therein, the pitch thereof, and the other dimensions and characteristics thereof can be varied within the scope of this invention as required to meet the various applications of such a packing ring 25. Similarly, the exact material from which the packing ring 25 is formed may be varied to suit the desired application and thus this ring may be made of rubber, plastics and other resilient materials, some of which may resist corrosion or attack by corrosive liquids and gases.

In order to provide a continuous contacting surface between the plurality of springs 60 and the graphite bearing 30, it is possible to use a continuous ring 62 imbedded in the contacting surface 31 to engage the right-hand end of each of the springs 60 which then evenly exert pressure against the rotating graphite bearing 30, as shown in FIG. 2. Moreover, such a ring can be placed in the opposite contacting surface 55 without departing from the scope of the invention.

The rings 62 can be utilized during the molding of the packing ring 20 since such rings 62 would provide for alignment and positioning of the springs 60 during the molding process. They also serve the important purpose of preventing the springs from puncturing through the rubber or plastic material 54 after the ring has been formed. It may even be desirable to utilize a magnetized ring 62 for holding the packing ring 30 in position when in use, or for holding the springs 60 in position during molding of the material 54 around the springs.

In operation, the shaft 10 rotates the member 15 with respect to the stationary member 40. It is desired to provide a fluid tight frictionless seal between the spaces 50 and 51, and this is accomplished by the seal assembly 20. The graphite bearings 30 and 45 are urged into intimate frictionless contact by the packing ring 25 which consists of an annular ring of resilient material 54 having imbedded therein the coil springs 60 which extend in the direction of the forces required to maintain the bearings 30 and 45 in contact. The packing ring 25 prevents flow of fluid between the rotating member 15, the support 21, and the bearing 30 in addition to maintaining the bearings 30 and 45 in intimate contact. Moreover, if a corrosive fluid is being handled by the apparatus, the material 54 of the packing ring 25 protects the springs against corrosion.

Another embodiment of the invention is shown in FIGS. 4–6 wherein the sealing assembly 20a is identical to that shown and described above except for the spring 70 imbedded in the packing ring 25a. Specifically, the ring 25a includes the spring 70 having a continuous inner V or U-shaped portion 72 which extends around the entire packing ring 25a and has a major axis common with that of the entire ring 54a. At spaced intervals along the outermost edges 73 of the V or U-shaped portion 72 are the radially outwardly extending fingers 74 parallel to the adjacent contacting surfaces 31 and 55. When the packing ring 25a is clamped in position the fingers 74 and the portion 72 exert pressure urging the seals 30 and 45 into contact. The number and size of the fingers 74 can be varied as required by the particular application without departing from the invention.

Another embodiment of the invention is shown in FIGS. 7 and 8 wherein the sealing assembly is substantially identical to that shown and described in FIGS. 4–6 except that the particular spring 80 utilized in the packing ring has continuous side portions 82 on the V or U-shaped portion 83. Thus, the cross-section of the spring member, as shown in FIG. 8, forms more of a U-shaped member with the continuous outer side portions 82 exerting more pressure when this packing ring is placed under pressure as a result of forces applied simultaneously to the opposite contacting surfaces 30 and 45.

The invention has thus provided a composite packing ring which provides a fluid tight seal between two members as well as a biasing force to maintain two bearing members in intimate contact. The imbedding of the spring members within the packing ring protects the spring members from contact with corrosive gases or liquids, reduces the time required to assemble the bearing assembly, and reduces the space required for the packing assembly.

While the forms of apparatus herein described constitute preferred embodiments of the invention, it is to be understood that the invention is not limited to these precise forms of apparatus, and that changes may be made therein without departing from the scope of the invention.

What is claimed is:
1. An improved seal assembly adapted to be positioned between relative rotatable members to form a fluid tight seal therebetween, comprising a bearing ring adapted to engage one of said members, a resilient packing ring having a first radial face engaging said bearing ring and a second radial face engaging the other said member, a plurality of circumferentially spaced coil springs embedded within said resilient packing ring to protect said springs from corrosion and disposed with their axes extending parallel to the axis of said packing ring, a rigid pressure ring recessed within said first radial face of said sealing ring and also engaging said bearing ring, and said pressure ring being engaged by said coil springs to effect uniform distribution of the forces exerted by said coil springs against said bearing ring.

2. A seal assembly as defined in claim 1 wherein said first face of said packing ring engages said bearing ring both radially inwardly and radially outwardly of said pressure ring.

3. A seal assembly as defined in claim 1 wherein said packing ring and said pressure ring each have a rectangular cross-sectional configuration.

References Cited
UNITED STATES PATENTS

| 2,447,663 | 8/1948 | Payne | 277—86 |
| 3,252,707 | 5/1966 | Mirsky | 277—235 X |
| 2,836,124 | 5/1958 | Lung | 277—92 X |
| 2,886,352 | 5/1959 | Krellner | 277—92 X |
| 3,269,738 | 8/1966 | Bäumler et al. | 277—92 X |

FOREIGN PATENTS 985,844   3/1965   Great Britain.

LAVERNE D. GEIGER, Primary Examiner

J. S. MEDNICK, Assistant Examiner

U.S. Cl. X.R.

277—92